P. PRYIBIL.

Saw-Guides.

No. 134,704. Patented Jan. 7, 1873.

Witnesses.
Ernst Bilhuber.
Chas Wahlers.

Inventor.
Paul Pryibil
Van Santvoord & Hauff
Attys

UNITED STATES PATENT OFFICE.

PAUL PRYIBIL, OF NEW YORK, N. Y.

IMPROVEMENT IN SAW-GUIDES.

Specification forming part of Letters Patent No. 134,704, dated January 7, 1873.

*To all whom it may concern:*

Be it known that I, PAUL PRYIBIL, of the city, county, and State of New York, have invented a new and useful Improvement in Saw-Guides; and I do hereby declare the following to be a full, clear, and exact description thereof, which will enable those skilled in the art to make and use the same, reference being had to the accompanying drawing forming part of this specification, in which drawing—

Figure 1:
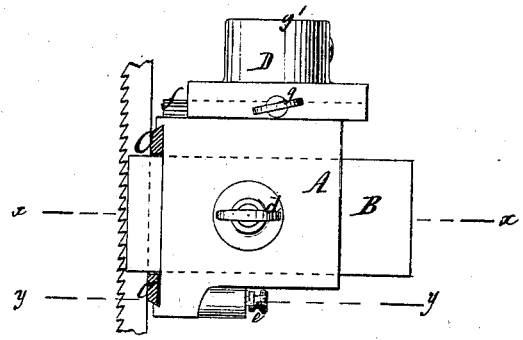
Figure 2:
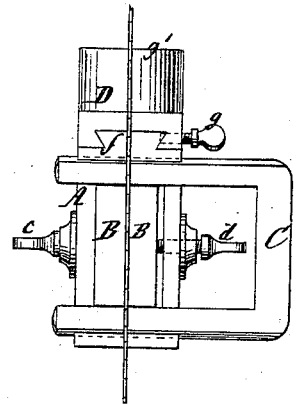
Figure 3:
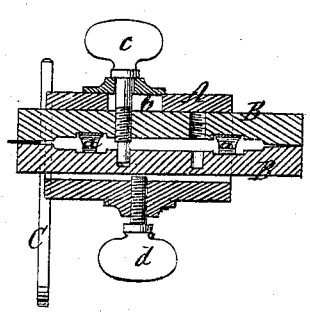
Figure 4:
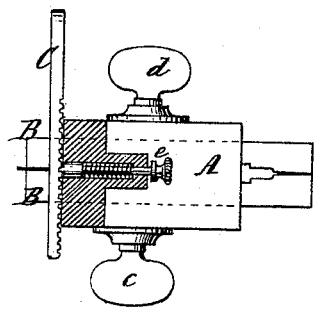

Figure 1 represents a sectional side view of this invention; Fig. 2 is a front view of the same; Fig. 3 is a horizontal section of the same in the plane $x\ x$, Fig. 1; and Fig. 4 is a similar section in the plane $y\ y$, Fig. 1, and looking upward.

Similar letters indicate corresponding parts.

This invention consists in the arrangement of two jaws, which fit into a suitable guide-piece, with a retaining-screw and with an adjusting-screw in such a manner that by means of the retaining-screw, the jaws can be set to correspond to the width of the saw, while the adjusting-screw serves to regulate the position of the jaws in relation to each other according to the thickness of the saw, and by these means a guide is obtained which can be readily and conveniently adjusted for all sizes of saws; further, in a movable abutment which fits between the back of the saw and the guide of the jaws, and which is retained in position by a spring-catch or locking device of any suitable construction, in such a manner that, when the saw wears into the abutment at one place, said abutment can be moved and adjusted to present a fresh and intact surface to the back of the saw, and the back of the saw is effectually prevented from eating into the guide; also, in the arrangement of a slide, provided with a socket, to be secured to the frame of the sawing-machine, and fitted on suitable guide-ways on the guide of the jaws in such a manner that, if any saw-guide is used for an endless band-saw, by moving the slide said saw can be made to run on any portion of the pulley, and thus the surface of the pulley can be made to wear uniformly throughout.

In the drawing, the letter A designates a guide-piece, made of cast-iron or any other suitable material, and provided with a socket to receive the jaws B B. These jaws are detached from each other, being connected simply by steady-pins, so that they are compelled to preserve their relative position toward each other, and springs $a\ a$, interposed between them, have a tendency to force the jaws apart for the reception of the saw. The working ends of the jaws are slightly beveled, so that they bear upon the saw interposed between them close at their ends, and the central portions of the jaw are cut down so that the ends, when worn, can be readily ground down. It will be seen from the drawing that said jaws are reversible, so that they can be brought in working position with either end. In one side of the guide-piece A is an oblong slot, $b$, Fig. 3, through which extends a screw, $c$, which is tapped in one of the jaws, while its tip extends into a socket formed in the other jaw, so that, by tightening said screw, both jaws are retained in position in the guide-piece, being free, however, to open and close. Through the opposite side of the guide-piece extends a set-screw, $d$, which is tapped into the end of the guide-piece and bears upon one of the jaws, so that by turning this screw in one direction the jaws can be closed, and by turning it in the opposite direction the jaws are allowed to open by the action of their springs $a\ a$. By means of the retaining-screw $c$ the jaws can be adjusted so that the distance to which they project beyond the end of the guide-piece will correspond to the width of the saw-blade, and by the set-screw $d$ the position of the jaws in relation to each other is so regulated that they hug the saw closely, allowing the same to move freely between them. Between the back of the saw and the guide-piece A I have interposed an abutment, C, which is, by preference, made U-shaped, (see Fig. 2,) and which straddles the jaws, so that the back of the saw abuts against it above and below said jaws. This abutment is made of steel and hardened, and it is retained in position by a spring-catch, $e$, or by any suitable locking device, so that, when the saw has eaten into one portion of said abutment, another portion thereof can be moved behind the saw, and if the entire surface of the abutment should have worn uneven it can be readily taken out and ground off so as to present an even surface to the saw. By this abutment the saw is prevented from eating into the guide-piece A, and a smooth and even surface can be presented to the back of the saw at all times without difficulty. In practice I prefer to provide the abutment C with a series of fine teeth, (see Fig. 4,) which engage with the spring-catch e, thereby enabling the workman to move the abutment a uniform distance each time when the saw has eaten into one portion of the abutment. My saw-guide is intended particularly for endless band-saws, which run over pulleys, and which, when allowed to run always on the same portion of the face of said pulleys, are liable to wear into them, thereby necessitating frequent repairs. I have therefore combined with my saw-guide a slide, D, which is fitted on guide-ways f on the top of the guide-piece A, and which is provided with a socket, g', by means of which it is secured to the main frame of the sawing-machine. A set-screw, g, serves to adjust the slide D in any desired position.

By this arrangement I am enabled to move the guide-piece A in or out in the slide D, and the saw can be made to run on any portion of the pulley, so that, with little care, the entire face of the pulley can be made to wear uniformly.

This improvement is particularly desirable when the pulleys for the saw are covered with India rubber or other soft and strongly-frictional material.

What I claim as new, and desire to secure by Letters Patent, is—

1. The combination of the reversible jaws B B, guide-piece A, retaining-screw c, set-screw d, and reacting spring or springs a, substantially as herein shown, for the purpose specified.

2. The abutment C made detached from the guide-piece A and secured in position by a spring-catch or other suitable fastening, in combination with said guide-piece and with the jaws B B, the whole constructed and operating substantially in the manner and for the purpose set forth.

3. The slide D, in combination with the guide-piece A and jaws B B, substantially as and for the purpose described.

This specification signed by me this 7th day of November, 1872.

PAUL PRYIBIL.

Witnesses:
W. HAUFF,
E. F. KASTENHUBER.